(No Model.)
W. NEWLIN & S. WHITEHALL.
METHOD OF MAKING WHEELS FOR VEHICLES, &c.
No. 279,584. Patented June 19, 1883.
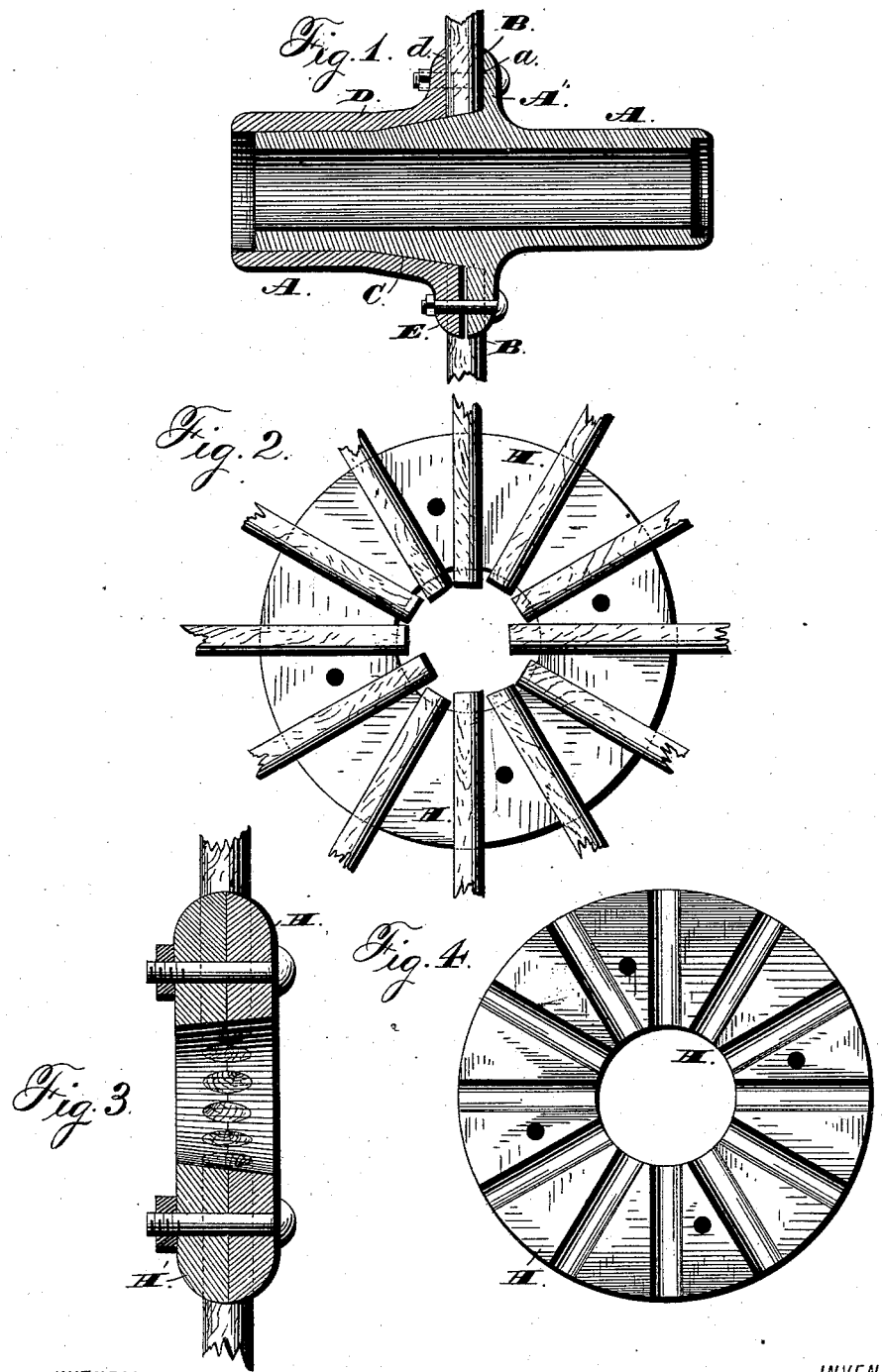

UNITED STATES PATENT OFFICE.

WILLIAM NEWLIN AND SAMUEL WHITEHALL, OF ATTICA, INDIANA.

METHOD OF MAKING WHEELS FOR VEHICLES, &c.

SPECIFICATION forming part of Letters Patent No. 279,584, dated June 19, 1883.

Application filed March 27, 1883. (No model.)

*To all whom it may concern:*

Be it known that we, WILLIAM NEWLIN and SAMUEL WHITEHALL, of Attica, in the county of Fountain and State of Indiana, have invented certain new and useful Improvements in Vehicle-Wheels; and we do hereby declare the following to be a full, clear, and exact description of the invention, such as will enable others skilled in the art to which it pertains to make and use the same.

Our invention relates to an improvement in the process of making vehicle-wheels, and more particularly those shown and described in Patent No. 258,834, granted to us May 30, 1882.
The object of our invention is to overcome the difficulty of getting the spokes of proper length by first securing the spokes to the tire, then boring or cutting away and beveling the inner ends of the spokes for the insertion of the hub, and finally securing the two-part hub in position.

In the accompanying drawings, Figure 1 is a sectional view of our patented wheel. Fig. 2 shows the manner of securing the inner ends of the spokes together preparatory to shaping them. Fig. 3 is a vertical sectional view through the clamping-plates, and Fig. 4 is a plan view of one of the clamping-plates.

In Fig. 1 we have shown a view of our patented wheel, which consists of an axle-box, A, provided with an annular flange, A', formed integral therewith, and provided with a series of slots or indentations, a, adapted to receive the spoke-tenons B. Upon the inner side of said flange, and adjacent thereto, the axle-box A is provided with the annular tapering or inclined bearing C.

D is the clamping-sleeve, adapted to fit upon the inner end of the axle-box A. The outer end of this sleeve is provided with an annular flange, E, provided with slots or indentations d, corresponding to those of the flange A' of the axle-box. The flanged end of the sleeve is beveled to conform to the inclined bearing C, and is adapted to be forced upon the inclined bearing C to firmly clamp the spokes between the flanges A' and E.

The difficulty in putting these wheels together consists in accurately sizing the length of the spokes to correspond with the tire and hub of the wheel, owing to irregularities in the diameter of the tire, which causes one or more spokes to project inwardly beyond the other spokes. We overcome this obstacle by first bending and welding the tire, and then drilling the holes for the insertion of the ends of the spokes. The spokes are then secured in position with their inner ends converging to the center of the wheel. The tire, with its attached spokes, is then laid on a clamping-plate, H, which latter is provided with grooves or indentations to correspond with the spokes. This clamping-plate is provided centrally with a beveled opening, which latter is slightly smaller than the circumference of the inclined bearing C of the axle-box A. A second clamping-plate, H', constructed similar to the plate H, is then placed in position on the spokes, and the two plates H and H' are secured together by bolts or other means, which latter hold the spokes in proper relative position. The upper and lower plates, H' and H, are made to register with each other, and are so secured to the spokes that the hub will be in the center of the wheel. Both plates are provided with openings having beveled walls, which conform in size and shape to the inclined bearing C. The wheel, with its attached plates, is then placed under a boring-tool having a tapering bit of size sufficient to bore or cut off the ends of the spokes projecting into the central opening in the plates H H', and the spokes cut to the proper size and the ends thereof beveled in one operation. The plates H H' are then removed from the spokes and the axle-box A inserted in the opening formed by the boring-tool. The sleeve D is then placed on the axle-box and forced upon the inclined bearing, which pushes the inner ends of the spokes outward and gives the desired strain upon the tire. The sleeve D is then firmly secured in place by the bolts I. This method of fitting wheels together is exceedingly simple and considerably cheapens the cost of manufacture of wheels.

Instead of using a boring-machine for cutting off the ends of the spoke, a punch or cutting-tool can be used and answer all necessary purposes.

While we have described this improvement as particularly applicable in the manufacture of the wheels shown and described in our patent previously referred to, yet we would have it understood that we do not limit the application of this improvement to any particular construction of wheel, but consider ourselves at liberty to apply it whenever it can be advantageously employed.

Having fully described our invention, what we claim as new, and desire to secure by Letters Patent, is—

1. The process of forming vehicle-wheels, consisting in first securing the spokes to the tire and then cutting away the inner ends of the spokes to fit the hub, substantially as set forth.

2. The process of forming vehicle-wheels, consisting in first securing the spokes to the tire, then securing the spokes between clamping-plates, and finally cutting away the inner ends of the spokes to fit the hub.

In testimony whereof we have signed this specification in the presence of two subscribing witnesses.

WILLIAM NEWLIN.
SAMUEL WHITEHALL.

Witnesses:
 WILL B. REED,
 JAKE ROBEY.